US011321347B1

(12) United States Patent
Clifford et al.

(10) Patent No.: US 11,321,347 B1
(45) Date of Patent: May 3, 2022

(54) PARTITIONING AGRICULTURAL FIELDS FOR ANNOTATION

(71) Applicant: X Development LLC, Mountain View, CA (US)

(72) Inventors: David Clifford, South San Francisco, CA (US); Ming Zheng, Redwood City, CA (US); Elliott Grant, Woodside, CA (US); Nanzhu Wang, San Jose, CA (US); Cheng-en Guo, Santa Clara, CA (US); Aleksandra Deis, Sunnyvale, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 17/075,242

(22) Filed: Oct. 20, 2020

(51) Int. Cl.
*G06F 16/29* (2019.01)
*G06Q 50/02* (2012.01)
(Continued)

(52) U.S. Cl.
CPC .......... *G06F 16/26* (2019.01); *G06F 3/04847* (2013.01); *G06F 16/248* (2019.01);
(Continued)

(58) Field of Classification Search
CPC ........ G06F 16/29; G06F 16/26; G06F 16/248; G06F 16/904; G06F 16/9038; G06F 16/285; G06F 16/906; G06F 3/04847; G06F 2203/04806; G06Q 10/063; G06Q 50/02; G06K 9/6219; G06K 9/6223; Y02A 90/30; Y02A 40/22; Y02A 40/28; Y02A 40/90; G06T 11/206
See application file for complete search history.

(56) References Cited

U.S. PATENT DOCUMENTS 10,398,096 B2  9/2019  Hassanzadeh et al.
10,448,582 B2  10/2019  Jaagyasi et al.
(Continued)

OTHER PUBLICATIONS

Arifin, Muhammad Tajul et al.; Processing system of MODIS data for monitoring the changes of paddy field; ScienceDirect; 11 pages; dated 2015.
(Continued)

*Primary Examiner* — Justin R. Blaufeld
(74) *Attorney, Agent, or Firm* — Middleton Reutlinger

(57) ABSTRACT

Some implementations herein relate to a graphical user interface (GUI) that facilitates dynamically partitioning agricultural fields into clusters on an individual agricultural field-basis using agricultural features. A map of a geographic area containing a plurality of agricultural fields may be rendered as part of a GUI. The agricultural fields may be partitioned into a first set of clusters based on a first granularity value and agricultural features of individual agricultural fields. The individual agricultural fields may be visually annotated in the GUI to convey the first set of clusters of similar agricultural fields. Upon receipt of a second granularity value different from the first granularity value, the agricultural fields may be partitioned into a second set of clusters of similar agricultural fields. The map of the geographic area may be updated so that individual agricultural fields are visually annotated to convey the second set of clusters.

18 Claims, 9 Drawing Sheets

(51) Int. Cl.

| | | |
|---|---|---|
| *G06F 3/0484* | (2013.01) | |
| *G06F 16/906* | (2019.01) | |
| *G06F 16/28* | (2019.01) | |
| *G06Q 10/06* | (2012.01) | |
| *G06F 16/26* | (2019.01) | |
| *G06F 16/9038* | (2019.01) | |
| *G06F 16/904* | (2019.01) | |
| *G06F 16/248* | (2019.01) | |
| *G06K 9/62* | (2006.01) | |
| *G06F 3/04847* | (2022.01) | |
| *G06T 11/20* | (2006.01) | |

(52) U.S. Cl.
CPC .......... *G06F 16/285* (2019.01); *G06F 16/29* (2019.01); *G06F 16/904* (2019.01); *G06F 16/906* (2019.01); *G06F 16/9038* (2019.01); *G06Q 10/063* (2013.01); *G06Q 50/02* (2013.01); *G06F 2203/04806* (2013.01); *G06K 9/6219* (2013.01); *G06K 9/6223* (2013.01); *G06T 11/206* (2013.01); *Y02A 40/22* (2018.01); *Y02A 40/28* (2018.01); *Y02A 40/90* (2018.01); *Y02A 90/30* (2018.01)

(56) References Cited

U.S. PATENT DOCUMENTS

| | | | | |
|---|---|---|---|---|
| 2001/0015733 | A1* | 8/2001 | Sklar | G06F 16/2425 715/853 |
| 2011/0270705 | A1* | 11/2011 | Parker | G06F 16/29 705/26.61 |
| 2014/0063020 | A1* | 3/2014 | Den Herder | G06T 11/206 345/441 |
| 2016/0171302 | A1* | 6/2016 | Lavigne | G06K 9/6268 382/110 |
| 2016/0308954 | A1 | 10/2016 | Wilbur et al. | |
| 2017/0041407 | A1* | 2/2017 | Wilbur | H04W 4/60 |
| 2017/0052747 | A1* | 2/2017 | Cervelli | G06F 3/0482 |
| 2018/0032492 | A1* | 2/2018 | Altshuller | G06N 5/045 |
| 2018/0132422 | A1* | 5/2018 | Hassanzadeh | G06Q 50/02 |
| 2018/0132423 | A1* | 5/2018 | Rowan | A01B 79/005 |
| 2018/0365267 | A1* | 12/2018 | Sarangi | G06F 16/2457 |
| 2021/0027503 | A1* | 1/2021 | Kumaresan | G06F 40/183 |
| 2021/0117448 | A1* | 4/2021 | Wang | G06F 16/285 |

OTHER PUBLICATIONS

Pascucci, Simone et al.; A Comparison between Standard and Functional Clustering Methodologies: Application to Agricultural Fields for Yield Pattern Assessment; Remote Sensing; 21 pages; dated 2018.

Williams, Carol L. et al.; Agro-ecoregionalization of Iowa using multivariate geographical clustering; ScienceDirect; 14 pages; dated 2007.

Bullock, P.; Ecological Zones; ScienceDirect; 16 pages; dated 1997.

Acock, Basil et al.; Software; Guics: A Generic User Interface for On-Farm Crap Simulations; pp. 657-665; dated 1999.

Gifford, Harry; Hierarchical k-Means for unsupervised learning; Canegie Mellon University; pp. 1-5; dated 2016.

B. Vandana et al.; Hybrid K Mean Clustering Algorithm for Crop Production Analysis in Agriculture; IJITEE; pp. 9-13; dated Dec. 2019.

Bunn, Christian et al.; Multiclass Classification of Agra-Ecological Zones for Arabica Coffee: An Improved Understanding of the Impacts of Climate Change; Plos One; pp. 1-16; dated 2015.

Patten, Timothy et al.; User Interface and Coverage Planner for Agricultural Robotics; ResearchGate; 9 pages; dated Dec. 20, 2015.

Pham, D. T. et a.; Selection of K in K-means clustering; Manufacturing Engineering Centre; pp. 103-119; dated 2004.

* cited by examiner

PARTITIONING AGRICULTURAL FIELDS FOR ANNOTATION

BACKGROUND

Agricultural entities such as individual farmers, agricultural cooperatives, and agricultural companies may periodically investigate farmland for a variety of purposes. For example, a farmer may wish to determine whether a particular crop field is a good candidate for expansion (e.g., acquisition, leasing, etc.). However, this can be a daunting task. There may be countless crop fields available, each with its own unique characteristics and/or history of stewardship. Moreover, a particular crop field's suitability to grow a particular variety of a crop—which may be manifested as an expected crop yield in some cases—is dependent on myriad factors. These factors may include, but not limited to, climate, soil composition, prevalence of plant disease (e.g., pests, fungus) and/or weeds in the area, and so forth. Farmland may be investigated for other purposes as well. For example, farmland valuation and/or crop insurance evaluation may involve quantifying risk of crop loss due to factors such as flood, drought, etc.

Agro-ecological zones (AEZs) are geographical areas with similar climatic and/or edaphic characteristics that convey the ability of those AEZs to support various types of crops. Each AEZ may have a similar combination of constraints and potential for land use, and therefore, each AEZ can serve as a focus for the targeting of recommendations designed to improve use of that land, either through increasing production or by limiting land degradation. AEZs may also be used for crop valuation and/or insurance. Conventional AEZs are partitioned based at least in part on factors unrelated to agriculture, such as between geopolitical boundaries such as state lines, county lines, etc. Moreover, conventional AEZs are partitioned at a relatively coarse level. Consequently, there may be individual agricultural fields within an AEZ that do not exhibit the combination of constraints and/or potential for land use attributed to the AEZ as a whole.

SUMMARY

Various implementations described herein relate to providing a graphical user interface (GUI) that facilitates dynamic partitioning of a plurality of agricultural fields into clusters or zones on an individual agricultural field-basis using climatic, edaphic, and/or landform features. These clusters or zones may be used for similar purposes as AEZs, and may therefore may be referred to herein as "custom AEZs." However, these clusters may be partitioned more granularly than traditional AEZs using clustering techniques such as K-means clustering. Moreover, the partitioning may be primarily or exclusively based on agriculturally-relevant features as opposed to geo-political features. Consequently, individual agricultural fields in a given custom AEZ may be more similar to each other in purely agricultural terms than individual agricultural fields in a traditional AEZ. Generating and presenting these clusters dynamically as part of a GUI enables the user to easily compare large numbers of individual agricultural fields for purposes such as land management, crop rotation, agricultural planning, measuring and/or managing risk in association with insurance, etc.

In some implementations, a plurality of agricultural fields may be partitioned into clusters based on a granularity value that influences how many different clusters are generated. For example, K-means clustering may be implemented to partition individual agricultural fields into clusters. Adjusting the K-value dictates how many clusters are created, and hence, the granularity of similarity between individual agricultural fields within each cluster. Accordingly, a K-value is one example of a granularity value that can be adjusted in order to select how granularly individual agricultural fields are partitioned into clusters. K-means clustering is just one example of a technique that can be used with implementations described herein for partitioning individual agricultural fields into clusters. Various other techniques are also contemplated, including but not limited to K-median clustering, mean-shift clustering, density-based spatial clustering of applications with noise (DBSCAN), expectation-maximization (EM) clustering using Gaussian mixture models (GMM), agglomerated hierarchical clustering, and so forth.

In many implementations, custom AEZs partitioned using techniques described here may be presented visually as part of a GUI. Such a GUI may enable a user to view an overhead map of a geographic area that includes a plurality of agricultural fields. The agricultural fields may be visually annotated, e.g., using color(s), shading, text, etc., to convey those custom AEZs to which the agricultural fields belong. Additionally, the user may be able to adjust the granularity value—which in many cases is the number of clusters to be created such as the K-value—in order to create more or less clusters with individual agricultural fields that are more or less similar to each other. For example, in some implementations, the user can operate a GUI element such as a slider bar to cause individual agricultural fields to be re-partitioned in accordance with the new granularity value.

In some implementations, additional annotations may be applied to custom AEZs to convey additional information beyond similarity between constituent agricultural fields of the AEZs. For example, in some implementations, a visual annotation for a given cluster of similar agricultural fields may be generated to convey feature(s) that were most (or least, if desired) influential for assigning the individual agricultural fields to the given cluster. These influential features may be helpful for the user to make decisions related to the agricultural fields in the cluster, such as how to cultivate a field, how to rotate crops in a field, how a field and/or crops to be grown thereon should be valued and/or insured, and so forth. For example, fields that are conveyed as being very similar to each other using techniques described herein may be valued and/or insured by a user at similar rates, as opposed to being valued and/or insured based primarily on those fields' locations relative to one or more geo-political boundaries.

In some implementations, the additional visual annotation may take the form of one or more histograms of features that make readily apparent which features are most influential. Additionally or alternatively, in some implementations in which clusters of individual agricultural fields are partitioned hierarchically, a decision tree may be fitted to the hierarchy of clusters, and the visual annotation for a given cluster may be determined using a path through the decision tree. In some such implementations, ranges, thresholds, and/or other statistical data generated by traversing the path through the decision tree may be mapped to semantically-meaningful words or phrases in order to provide a more intuitive interface for a user. In some cases these semantically-meaningful words or phrases may be similar to those used with traditional AEZs, such as "cold," "temperate," "hot," "dry," etc.

In some implementations, data engineering and/or pre-processing may be performed on agricultural features associated with individual agricultural fields in order to generate more meaningful and/or useful clusters. For example, any number of temporal features (e.g., represented as time-series data) such as rainfall over time, temperature over time, soil composition over time, etc., may be aggregated. To the extent value(s) are missing from any of these features, in some implementations, those values may be imputed, e.g., using a mean of available values for the feature.

In some implementations, the features/values may then be normalized to bring them to a similar scale. Weights may be selectively applied to some features in order to ensure that relatively sparse features are sufficiently considered. For example, there may be dozens of different climatic features available but a relatively small (or sparse) number of edaphic features, and yet the sparse edaphic features may be just as influential as the climatic features in determining how to manage a field. Accordingly, the relatively sparse edaphic features may be weighted relatively heavily compared to the climatic feature(s). Then, principal component analysis (PCA) may be applied to extract some number (e.g., fifteen) of principal components that account for the bulk of variance between agricultural fields.

In various implementations, a method may be implemented using one or more processors and may include: rendering, as part of a graphical user interface (GUI), a map of a geographic area containing a plurality of agricultural fields, wherein the plurality of agricultural fields are visually annotated on an individual agricultural field-basis to convey a first set of clusters of similar agricultural fields, and wherein the plurality of agricultural fields are partitioned into the first set of clusters based on a first granularity value and agricultural features of individual agricultural fields of the plurality of agricultural fields; receiving user input that indicates a second granularity value that is different than the first granularity value; based on the second granularity value and the agricultural features, partitioning the plurality of agricultural fields into a second set of clusters of similar agricultural fields, wherein a count of the second set of clusters is different than a count of the first set of clusters; and rendering, as part of the GUI, an updated map of the geographic area in which the plurality of agricultural fields are visually annotated on an individual agricultural field-basis to convey the second set of clusters of similar agricultural fields, wherein a given cluster of the second set of clusters is interactive to present an additional annotation about agricultural features shared among agricultural fields of the given cluster.

In various implementations, the method may include generating the additional visual annotation for a given cluster of the second set of clusters, wherein the additional visual annotation conveys one or more of the agricultural features that were most influential for partitioning the individual agricultural fields into the given cluster. In various implementations, the additional visual annotation may be a histogram of features. In various implementations, the second set of clusters comprises a hierarchy of clusters. In various implementations, the method may further include fitting a decision tree to the hierarchy of clusters. In various implementations, the additional visual annotation for the given cluster may be generated based on a path through the decision tree.

In various implementations, the partitioning may include performing K-means clustering, the first granularity value comprises a first K value, and the second granularity value comprises a second K value. In various implementations, the agricultural features of individual agricultural fields of the plurality of agricultural fields used to perform the partitioning may include one or more landform properties. In various implementations, the agricultural features of individual agricultural fields of the plurality of agricultural fields used to perform the partitioning include one or more edaphic features. In various implementations, the agricultural features of individual agricultural fields of the plurality of agricultural fields used to perform the partitioning include a measure of evapotranspiration.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
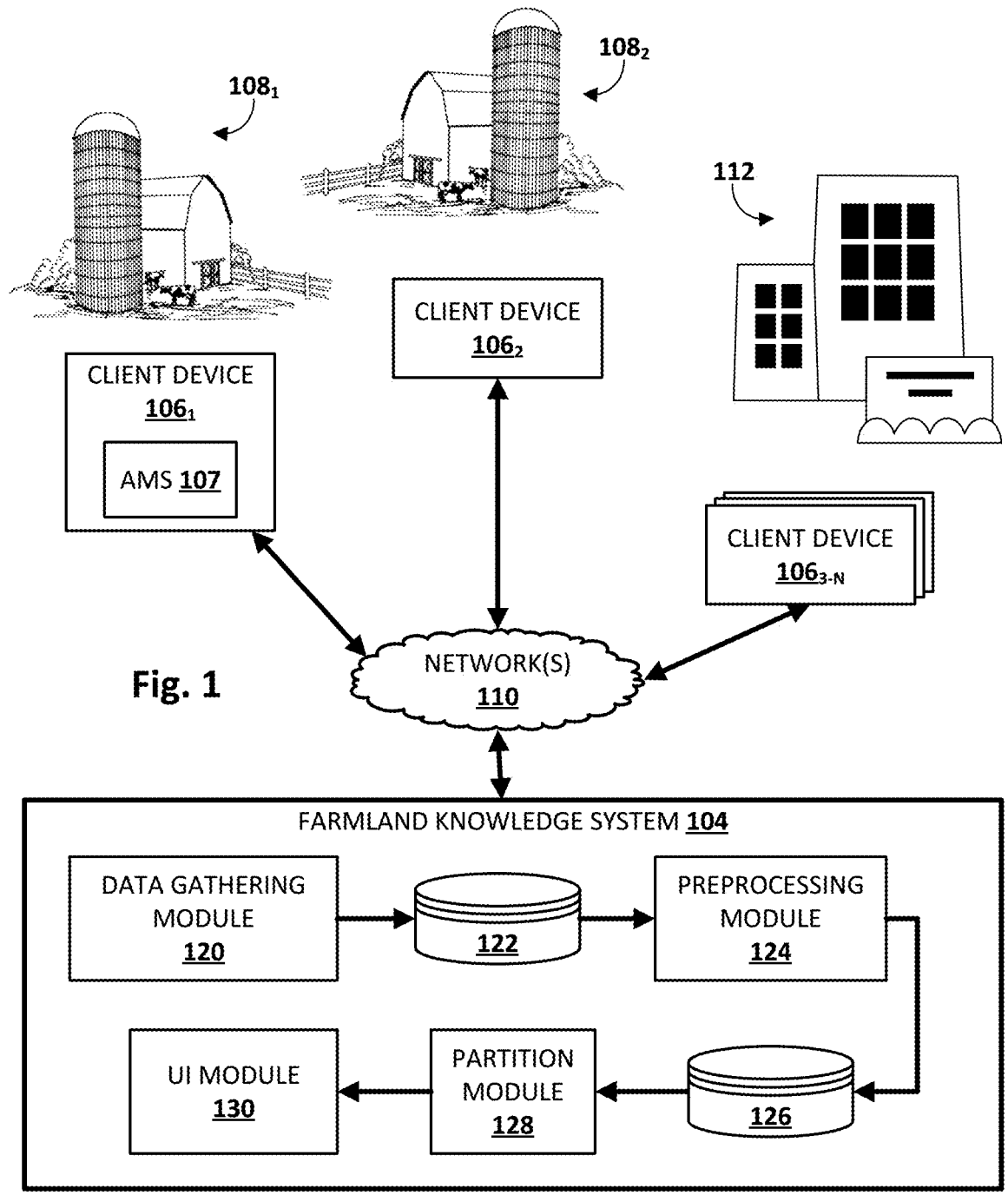
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. Various components in the environment are in communication with each other over one or more networks 110. Network(s) 110 may take various forms, such as one or more local or wide area networks (e.g., the Internet), one or more personal area networks (PANs), one or more mesh networks (e.g., ZigBee, Z-Wave), etc.

An individual (which in the current context may also be referred to as a "user") associated with an agricultural entity may operate one or more client devices $106_{1-N}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display (HMD) that provides an augmented reality (AR) or virtual reality (VR) immersive computing experience, a "smart" watch, and so forth.

Farmland knowledge system 104 is an example of an information system in which the techniques described herein may be implemented. Each of client devices 106 and farmland knowledge system 104 may include one or more memories for storage of data and software applications, one or more processors for accessing data and executing applications, and other components that facilitate communication over a network. The operations performed by client device 106 and/or farmland knowledge system 104 may be distributed across multiple computer systems.

In FIG. 1, first client device $106_1$ is associated with (e.g., controlled and/or maintained by) a first agricultural entity in the form of a first farm $108_1$. Similarly, a second client device $106_2$ is associated with a second agricultural entity in the form of a second farm $108_2$. One are more additional client devices $106_{3-N}$ are associated with another agricultural entity that takes the form of an organization 112 such as a commercial entity, a farming cooperative or "co-op," a governmental agency or department, etc. The environment depicted in FIG. 1, including the particular arrangement of agricultural entities and client devices that is depicted, is not meant to be limiting. Individual farms may be associated with multiple client devices, for instance.

Although not shown in FIG. 1, in various implementations, various devices may be deployed at each farm to, for instance, capture agricultural data at the farm. This agricultural data may include, but is not limited to, climate features, edaphic features, landform features, and so forth. These devices may include, but are not limited to, manned and/or unmanned aerial vehicles, farming equipment that is autonomous, driven by a person or towed by another vehicle, in-situ sensors such as weather stations, soil moisture monitors, etc.

Each client device 106 may operate a variety of different applications that may be used to perform various agricultural tasks, such as crop yield prediction and diagnosis, field searching, field-level crop management, plant-level phenotyping, partitioning of agricultural fields into clusters as described herein, etc. For example, first client device $106_1$ operates agricultural management software (AMS) 107 (e.g., which may be standalone or part of another application, such as part of a web browser). Other client devices 106 may operate similar applications.

In various implementations, farmland knowledge system 104 may be implemented across one or more computing systems that may be referred to as the "cloud." Farmland knowledge system 104 may include various components that, alone or in combination, perform selected aspects of the present disclosure. For example, in FIG. 1, farmland knowledge system 104 includes a data gathering module 120, a raw agricultural data index 122, a preprocessing module 124, a preprocessed data index 126, a partition module 128, and a user interface (UI) module 130. One or more of these modules may be omitted and/or combined with other modules, and may be implemented using any combination of hardware and software. In this specification, the term "database" and "index" will be used broadly to refer to any collection of data. The data of the database and/or the index does not need to be structured in any particular way and it can be stored on storage devices in one or more geographic locations.

Data gathering module 120 may be configured to gather, collect, request, obtain, and/or retrieve raw agricultural data from a variety of different sources, such as agricultural personnel, robot(s), aerial drones, satellite imagery, and so forth. Data gathering module 120 may store that raw agricultural data in raw agricultural data index 122. This agricultural data may be associated with individual agricultural fields, and may include various types of information (i.e. "features") about each agricultural field, such as climate features, edaphic features, landform features, and so forth. Climate features may include, for instance, precipitation levels/frequencies, temperatures, sunlight exposure, wind, humidity, plant disease, evapotranspiration (the sum of evaporation from the land surface plus transpiration from plants), and so forth. Edaphic features may include various information about soil, such as soil composition, soil pH, soil moisture, fraction data, soil organic carbon content, etc. Landform features may include, for instance, elevation, slope, distance to water, etc. In general, any type of data that has any influence on crop growth in an agricultural field ("agriculturally relevant") may be gathered by data gathering module 120 and stored in index 122.

Figure 7:
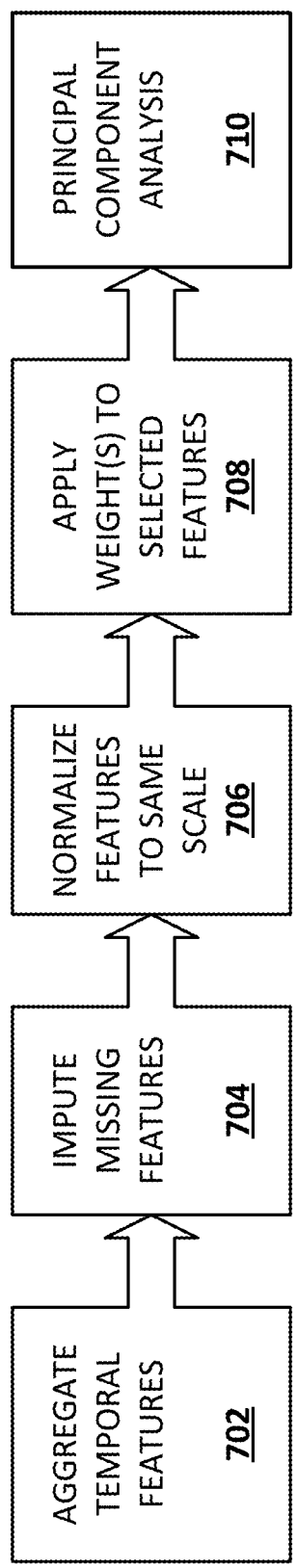
FIG. 7 schematically depicts an example of how features may be preprocessed in order to select principal components that are suitable for performance of techniques described herein, in accordance with various implementations.

The data stored in index 122 by data gathering module 120 may be raw agricultural data that is largely heterogeneous, and therefore, may not necessarily be in a suitable form for partitioning into clusters using techniques described herein. Accordingly, preprocessing module 124 may be configured to process raw data from index 122 and generate preprocessed data for storage in index 126. Preprocessed data may be normalized and/or missing values may be imputed. For example, climate features may be sampled at a higher frequency than, for instance, landform features, and therefore, preprocessing module 124 may impute missing landform features in order that dimensions of climate features and landform features correspond to each other. In some cases, preprocessing module 124 may perform techniques such as principal component analysis (PCA) to determine the most influential components/agricultural features on each agricultural field's membership in a cluster. One non-limiting example of how preprocessing module 124 may preprocess raw data from index 122 is depicted in FIG. 7.

Partition module 128 may be configured to analyze preprocessed data from index 126 in order to partition a plurality of agricultural fields into clusters of similar agricultural fields. These clusters are also referred to herein as "custom AEZs." In various implementations, partition module 128 may perform the partitioning in accordance with a granularity value that dictates how finely/coarsely agricultural fields should be clustered. In some implementations, the granularity value may correspond to a count or number of clusters that are generated. Partition module 128 may perform the partitioning based on the granularity value and on agricultural features of individual agricultural fields of the plurality of agricultural fields.

The granularity value may be manually selected by a user, as will be illustrated in subsequent figures, and/or may be set automatically based on a variety of signals, such as a zoom level being used to view overhead imagery of agricultural fields. Various techniques may be employed to partition the plurality of agricultural fields into clusters, including but not limited to K-means clustering, K-median clustering, mean-shift clustering, density-based spatial clustering of applications with noise (DBSCAN), expectation-maximization (EM) clustering using Gaussian mixture models (GMM), and/or agglomerated hierarchical clustering, to name a few.

UI module 130 may provide an interface through which applications such as AMS 107 may interface with farmland knowledge system 104 in order to implement selected aspects of the present disclosure. As one non-limiting example, UI module 130 may generate and/or distribute scripts, executable files, and/or interactive documents written in markup languages such as hypertext markup language (HTML) and/or extensible markup language (XML) (e.g., "web pages"). A user associated with an agricultural entity may operate an application on a client device 106 such as a web browser (not depicted) or AMS 107 to interact with these items. Additionally or alternatively, in some implementations, UI module 130 may provide an application programming interface (API) to which AMS 107 may connect. In some such implementations, AMS 107 may render its own GUI based on data exchanged with UI module 130.

UI module 130 may be configured to render, or cause a client device 106 to render, as part of a GUI, a map of a geographic area containing the plurality of agricultural fields under consideration. In some implementations, the map rendered/provided by UI module 130 may take the form of satellite imagery that depicts the geographic area from a high elevation. In other implementations the map of the geographic area may be rendered using raster (bitmap) or vector graphics. In either case, UI module 130 may annotate the plurality of agricultural fields visually on an individual agricultural field-basis to convey the set of clusters of similar agricultural fields. For example, all agricultural fields that are members of a given cluster of similar agricultural fields may be colored or pattern-filled uniformly.

In various implementations, a user may operate a client device 106 (e.g., via AMS 107) to provide user input that indicates a desired granularity value that may be, for instance, different than a current granularity value that was used by UI module 130 and/or AMS 107 to render clusters of similar agricultural fields. In some implementations, UI module 130 may provide this new granularity to partition module 128. Based on this new granularity value, and based on the agricultural features of the plurality of fields, partition module 128 may partition the plurality of agricultural fields into a new set of clusters of similar agricultural fields. Because the granularity value was changed, a count of the new set of clusters will be different than a count of the original set of clusters presented to the user previously. UI module 130 may then render, as part of the GUI, an updated map of the geographic area in which the plurality of agricultural fields are visually annotated on an individual agricultural field-basis to convey the new set of clusters of similar agricultural fields. In other implementations, one or more operations described herein as being performed by partition module 128 and/or by UI module 130 may be performed in whole or in part on client device 106, e.g., by AMS 107.

Figure 2:
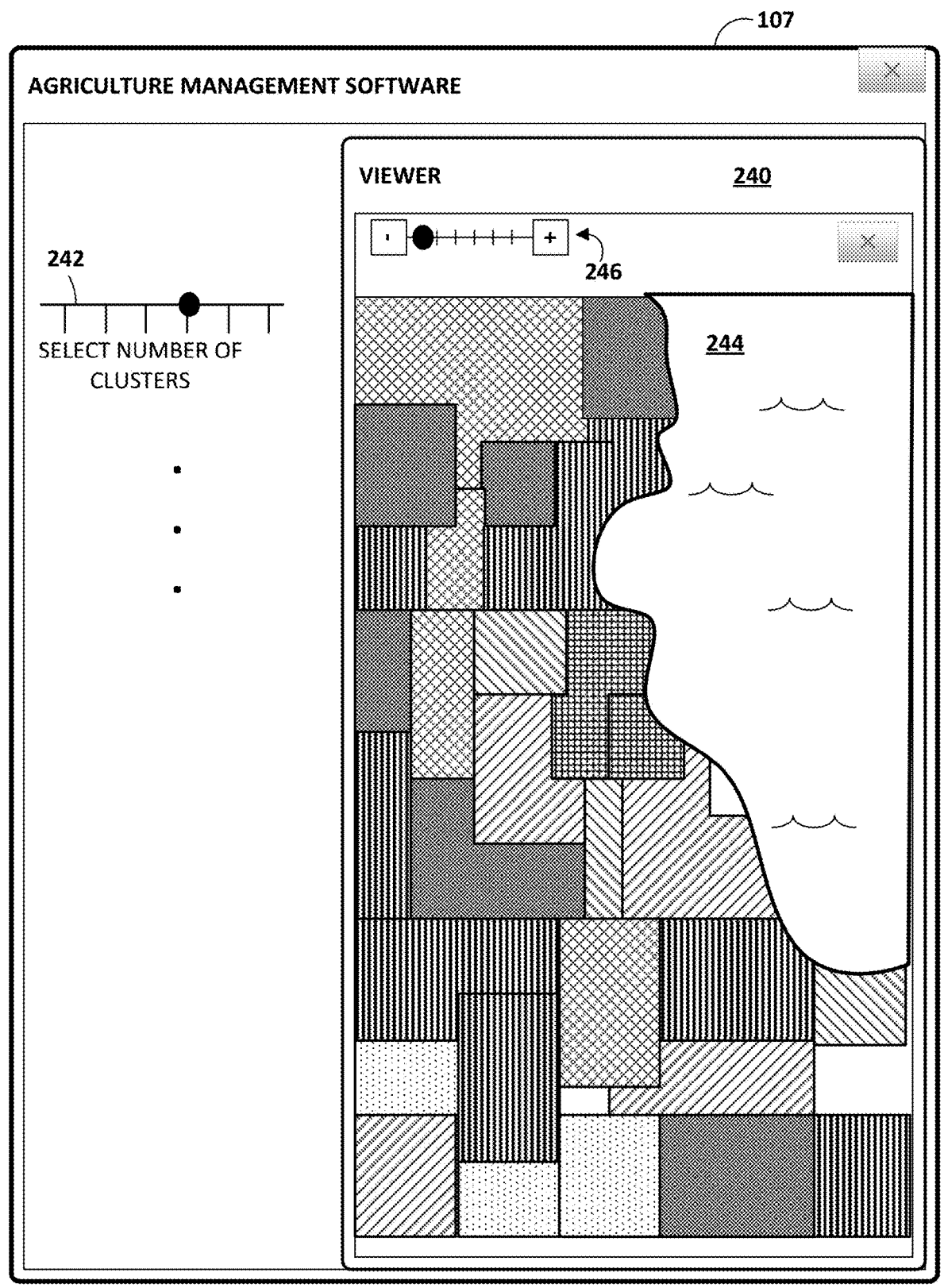
FIGS. 2, 3, and 4 schematically depict an example graphical user interface (GUI) that is rendered in accordance with selected aspects of the present disclosure, in accordance with various implementations.

FIG. 2 depicts one example of a GUI that may be rendered by AMS 107 in cooperation with UI module 130, in accordance with various implementations. The GUI includes a viewer 240, a granularity value adjustment element 242, and a zoom adjustment element 246. Adjustment elements 242 and 246 are depicted as sliders, but this is not meant to be limiting. These adjustment elements may take other forms, such as radio buttons, check boxes (e.g., to apply/remove filters), text inputs, etc. In implementations in which K-means clustering is employed, adjustment element 242 may be operable to adjust the K value. While only a granularity value adjustment element 242, is depicted in FIG. 2, as indicated by the ellipsis, there can be any number of additional adjustment elements for adjusting other parameters, such as filters that generate additional visual annotations for individual features (e.g., highlighting fields that receive greater than a threshold amount of natural precipitation).

Viewer 240 currently is rendering an overhead view of a geographic region that includes numerous individual agricultural fields (demarcated by the polygons of various shapes) and a body of water 244. While the agricultural fields are largely rectangular, this is not meant to be limiting, and agricultural fields can (and often do) take any geometric shape, including any polygon shape, ovular, circular, triangular, etc. In FIG. 2, granularity value adjustment element 242 is set to a relatively high value, indicating a user desire for a relatively high level of granularity (i.e., the user wants to see clusters that include fields that are highly similar to each other). Consequently, there are a relatively large number of different clusters depicted in FIG. 2, as indicated by the relatively large number of distinct fill patterns of FIG. 2 (each fill pattern signifying a different cluster of similar agricultural fields). While different clusters are demarcated in FIG. 2 using different fill patterns, other types of visual annotations, such as color fills having various levels of transparency, may be used in addition to or instead of fill patterns.

Figure 3:
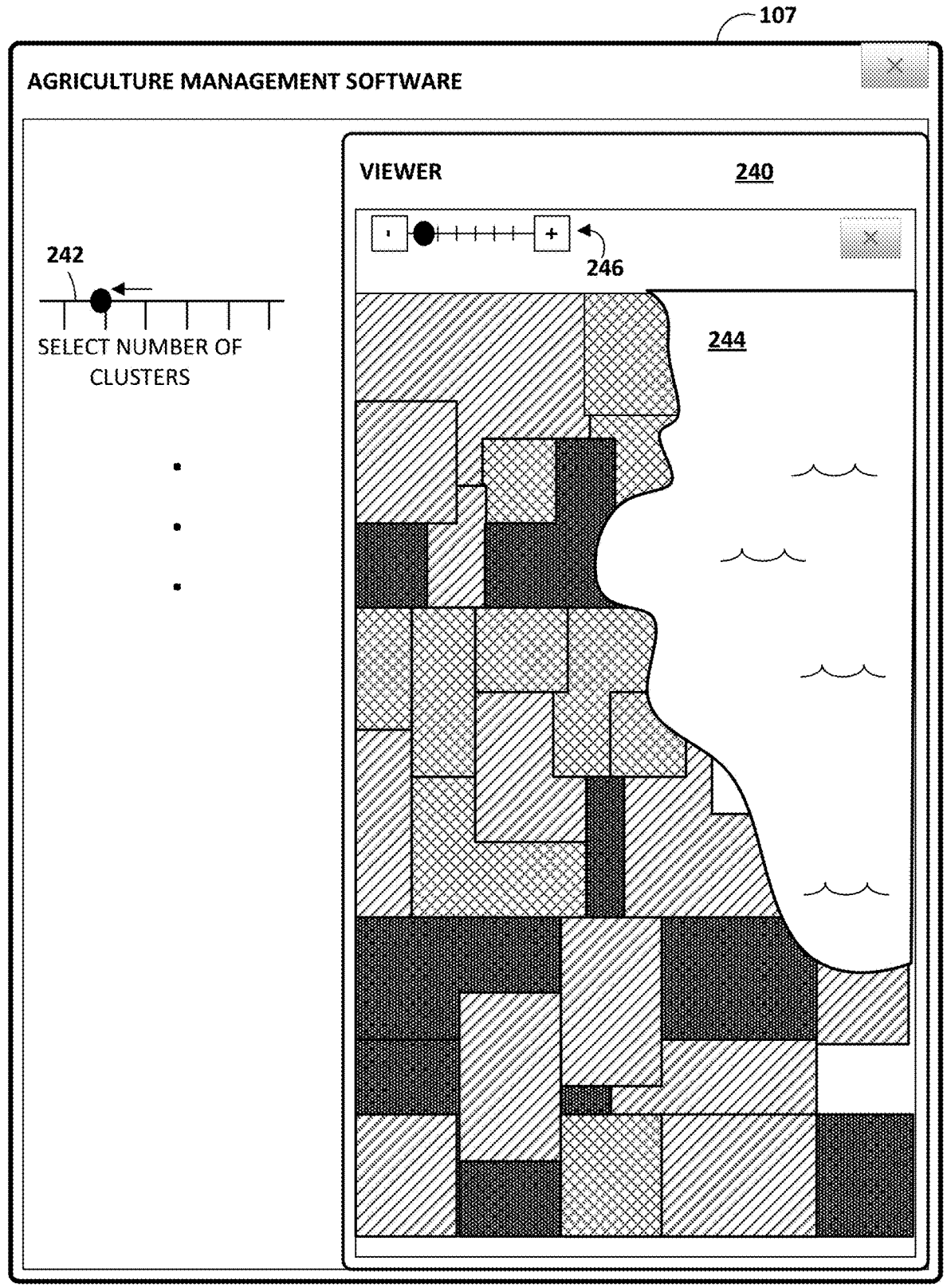

FIG. 3 depicts the same GUI as was depicted in FIG. 2 in a different state. In FIG. 3, the user has moved the granularity value adjustment element 242 to the left, as indicated by the arrow, in order to decrease the granularity value. Consequently, the plurality of agricultural fields will be re-partitioned into a smaller number of clusters of similar fields. This is shown in FIG. 3 where instead of the large number of distinct fill patterns of FIG. 2 being depicted, there are now a smaller number of fill patterns representing a smaller number (three) of clusters.

Figure 4:
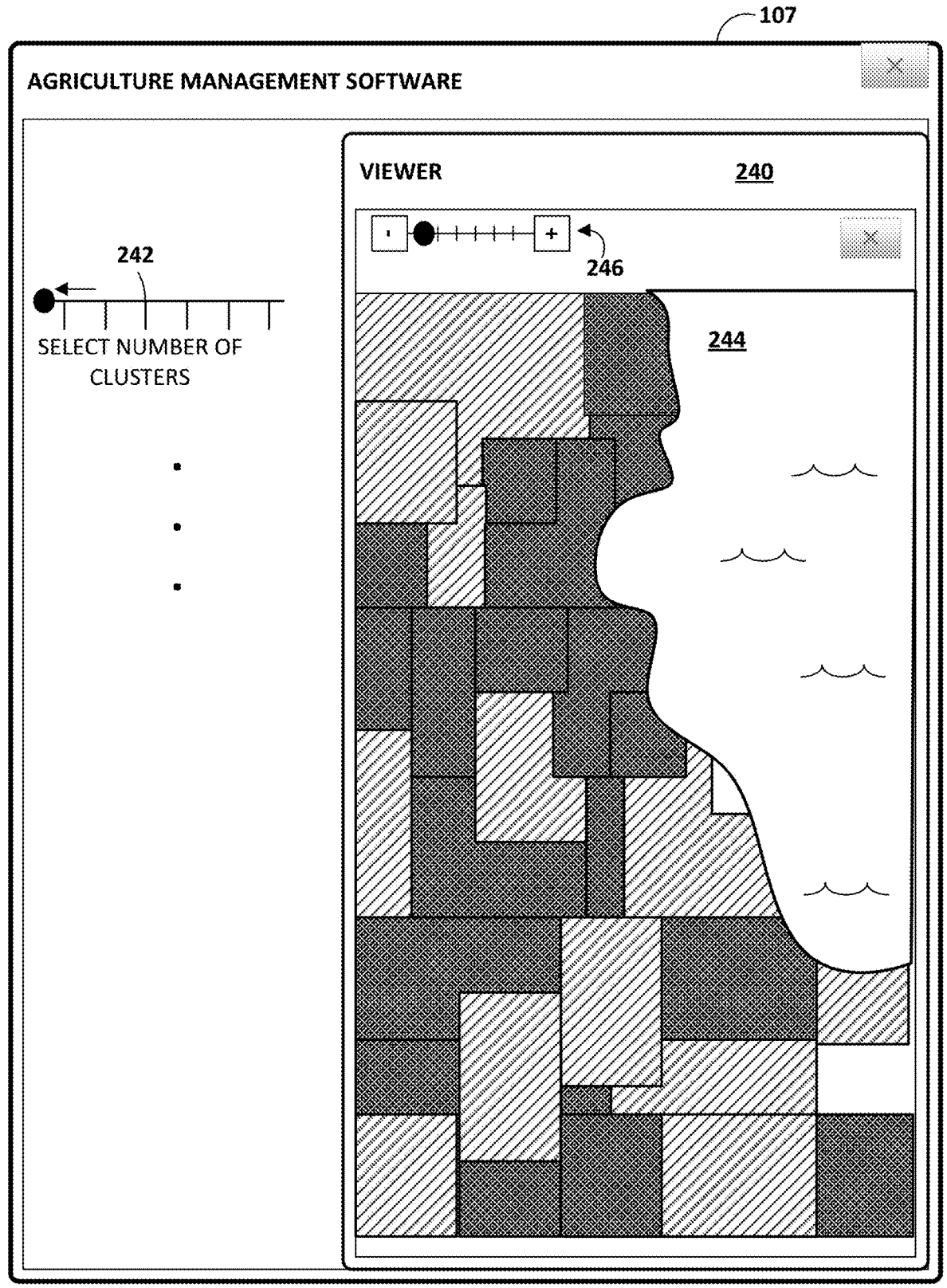

FIG. 4 depicts the same GUI as was depicted in FIGS. 2 and 3 in yet another state. In FIG. 4, the user has moved the granularity value adjustment element 242 all the way to the left, as indicated by the arrow, in order to decrease the granularity value further. Consequently, the plurality of agricultural fields will be re-partitioned into an even smaller number of clusters of similar fields than was depicted in FIG. 2. Thus, in FIG. 4, there are now only two different fill patterns representing two different clusters of similar agricultural fields.

In some implementations, AMS 107 and/or UI module 130 may be configured to generate and present additional visual annotations in association with clusters of similar agricultural fields, in addition to or instead of the colors or fill patterns described previously. For example, a user may wish to understand why agricultural fields belong to one cluster instead of another, or what agricultural features were most influential in a particular agricultural field being partitioned into a particular cluster. The additional visual annotation(s) therefore may be generated to convey one or more of the agricultural features that were most influential (or least influential if desired) for partitioning individual agricultural fields into a given cluster.

These additional visual annotations may be textual and/or non-textual, and may be presented in association with a cluster in response to various events. In some implementations, these additional annotations may be presented to a user (e.g., of AMS 107) when they somehow interact with cluster(s), such as by clicking on an individual agricultural field within a cluster (or clicking anywhere in a cluster in some cases), operating a pointing device such as a mouse to hover a graphical element such as a cursor over an individual field of a cluster (or over the cluster as a whole), etc. The additional visual annotation may be presented in various locations, such as in a pop-up window (e.g., over viewer 240 or elsewhere on the GUI), on a separate portion of the GUI from an overhead view, as text the overlays an overhead view of agricultural fields, etc.

In some implementations, the additional visual annotation that is presented for a given cluster of agricultural fields may take the form of a histogram of agricultural features. Histograms may be generated for individual features and/or groups of features, such as principal components determined by preprocessing module 124. Additionally, in some implementations, histograms may be generated that compare/contrast different agricultural features and/or compare agricultural features of one cluster to agricultural fields of one or more other clusters, or even to all agricultural fields in a geographic area.

FIGS. 5A-E depict multiple illustrative examples of types of histograms that may be generated to convey the most influential agricultural features in the given cluster. These histograms compare features of one cluster to features of another cluster, or even to a plurality of agricultural fields that were partitioned to create the cluster. The histograms of FIG. 5A may be generated, for instance, based on the two clusters shown in FIG. 4. Thus, the histogram bars with the bottom-left-to-top-right diagonal fill pattern (or "diagonal hatching") correspond to the similarly-filled agricultural fields in FIG. 4. And the histogram bars that are relatively darkly shaded correspond to the other cluster of fields depicted in FIG. 4.

Figure 5A:
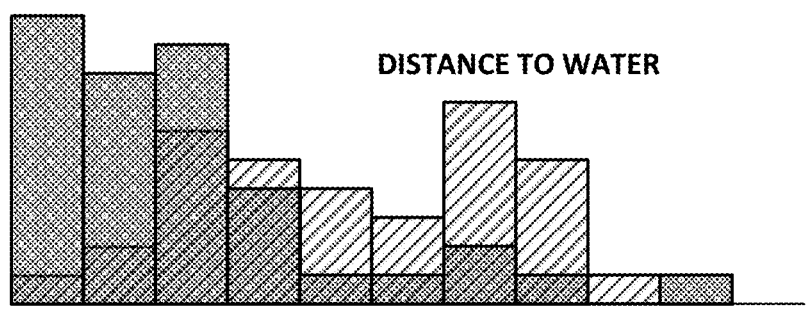
FIGS. 5A, 5B, 5C, 5D, and 5E depict examples of visual annotations in the form of histograms that may be rendered as part of a GUI configured with selected aspects of the present disclosure.

In FIG. 5A, a histogram is presented that compares distance to water between a first cluster of agricultural fields represented by the diagonal hatching and a second cluster (or a plurality of fields as a whole) represented by the shaded fill pattern. While not labeled, the horizontal axis represents "bins," with each bin corresponding to a particular distance to water (or a range of distances to water) and the distances increasing from left to right. The vertical axis represents the number of individual agricultural fields that match each distance-to-water bin. This histogram demonstrates that the first cluster (diagonal hatching) includes more fields with greater distances to water than the second cluster (shaded fill). Moreover, while the bars of FIG. 5A overlap to some extent, there is also some level of disparity (non-overlap) between them, which means distance to water is a somewhat influential feature that resulted in agricultural fields being partitioned into the first cluster or into the second cluster.

Figure 5B:
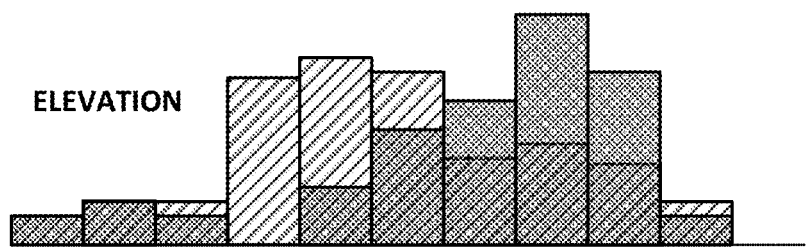

In FIG. 5B, a histogram is presented that compares elevation between the first cluster of agricultural fields represented by the diagonal hatching and the second cluster (or a plurality of fields as a whole) represented by the shaded fill pattern. While not labeled, the horizontal axis represents "bins," with each bin corresponding to a particular range of elevations and the elevations increasing from left to right. The vertical axis once again represents the number of individual agricultural fields that match each elevation bin. Similar to the histogram of FIG. 5A, this histogram demonstrates that the first cluster (diagonal hatching) includes more fields at lower elevations than the second cluster (shaded fill). Moreover, while the bars of FIG. 5B overlap to some extent, there is also some level of non-overlap between them, which indicates that elevation is a somewhat influential feature that resulted in agricultural fields being partitioned into the first cluster or into the second cluster.

Figure 5C:
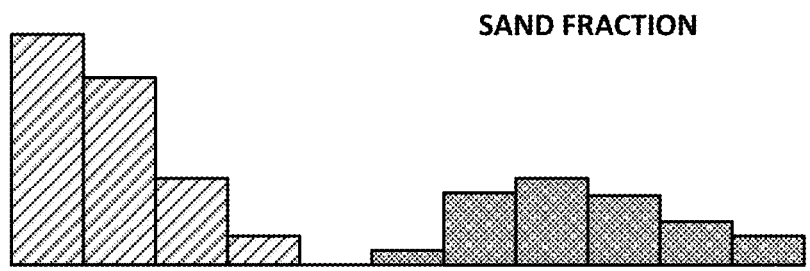

In FIG. 5C, a histogram is presented that compares measures of sand fraction between the first and second clusters of agricultural fields. The horizontal axis once again represents bins of ranges of sand fraction that increase from left to right. The vertical axis once again represents the number of individual agricultural fields that match each sand fraction bin. The histogram of FIG. 5C demonstrates a clearer separation between the first and second clusters than in FIG. 5A or 5B. The first cluster (diagonal hatching) clearly includes mostly lower sand fraction fields, and the second cluster (shaded fill) includes mostly higher sand fraction fields. There is little or no overlap between the histogram bars. Accordingly, it can be seen that sand fraction is a highly influential feature that resulted in agricultural fields being partitioned into the first cluster or into the second cluster.

Figure 5D:
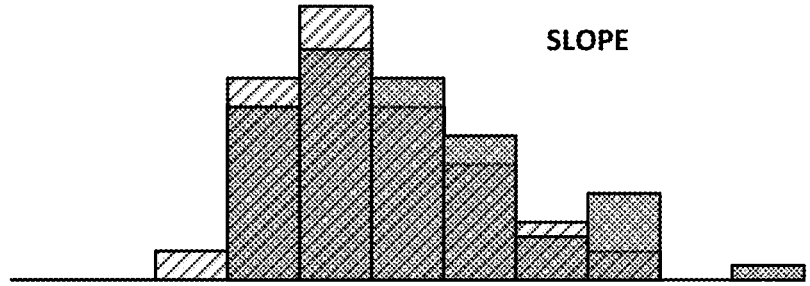

In FIG. 5D, a histogram is presented that compares measures of land slope between the first and second clusters of agricultural fields. The horizontal axis once again represents bins of ranges of slope that increase from left to right. The vertical axis once again represents the number of individual agricultural fields that match each land slope bin. In contrast to the histogram of FIG. 5C, the histogram of FIG. 5D fails to demonstrate much distinction between the first and second clusters based on slope. There is almost total overlap between the histogram bars. Accordingly, it can be seen that land slope is not at all a highly influential feature that resulted in agricultural fields being partitioned into the first cluster or into the second cluster.

Figure 5E:
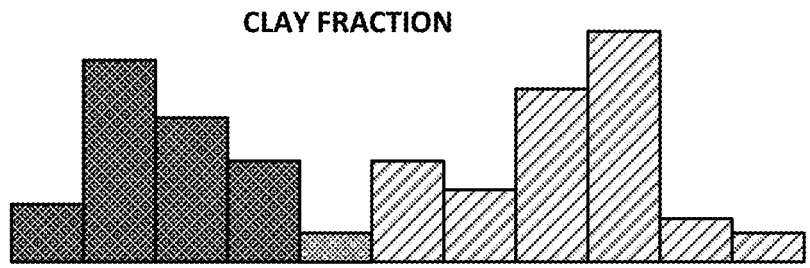

In FIG. 5E, a histogram is presented that compares measures of clay fraction between the first and second clusters of agricultural fields. The horizontal axis once again represents bins of ranges of sand fraction that increase from left to right. The vertical axis once again represents the number of individual agricultural fields that match each sand fraction bin. Like the histogram of FIG. 5C, the histogram of FIG. 5E demonstrates a very clear separation between the first and second clusters. Accordingly, it can be seen that clay fraction, like sand fraction, is a highly influential feature that resulted in agricultural fields being partitioned into the first cluster or into the second cluster.

Another type of additional visual annotation that may be generated, e.g., by AMS 107 and/or UI module 130, is based on a decision tree. In some implementations, partition module 128 may be configured to partition a plurality of agricultural fields not only into clusters, but into a hierarchy of clusters. In some such implementations, AMS 107 and/or UI module 130 may fit a decision tree to the hierarchy of clusters. The additional visual annotation for a given cluster may then be generated based on a path through the decision tree.

Figure 6:
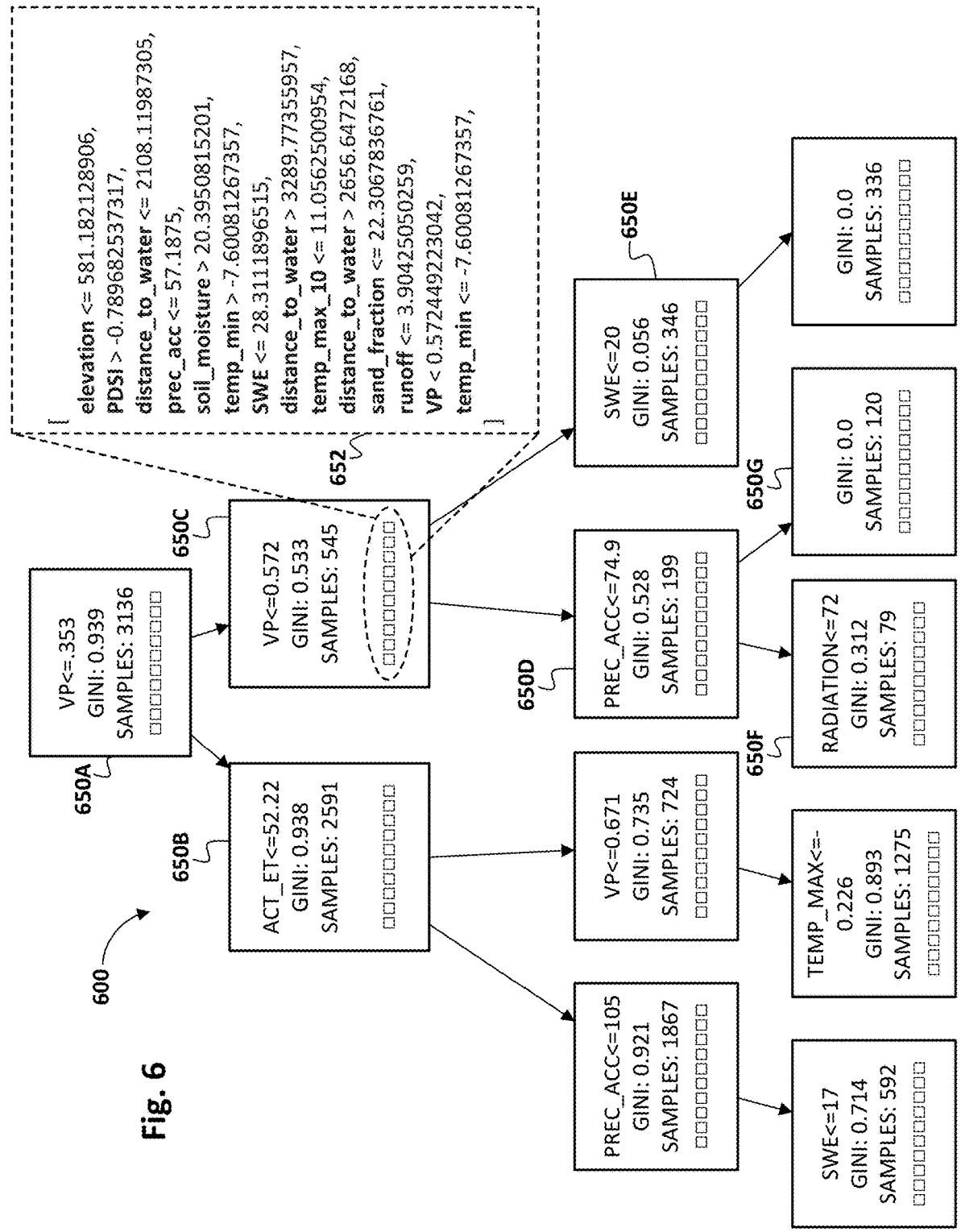
FIG. 6 schematically depicts another example of visual annotation that may be rendered as part of a GUI configured with selected aspects of the present disclosure.

FIG. 6 depicts one example of a decision tree 600 in which each node represents a cluster of agricultural fields and each edge defines the hierarchy that exists between the nodes. Coarser clusters are represented by nodes higher in decision tree 600, and more granular clusters are represented by nodes lower in decision tree 600. Each node includes a criterion that is used to split the cluster corresponding to that node into two or more clusters (e.g., two clusters for a binary decision tree) that are represented by that node's children. For the sake of simplicity, units of measure are not provided for the various agricultural features described in relation to FIG. 6; well-known and/or conventional units of measure may be used. Moreover, while some nodes are depicted with a single child node, it should be understood that any node of a decision tree that has any children nodes will have at least two children nodes. Some nodes are simply omitted due to limitations related to spacing. For example, node 650E is depicted with a single child node, when in reality it would have at least one additional child node.

The top node 650A in FIG. 6 is unconstrained and therefore represents all 3136 samples that are available, with each sample corresponding to an individual agricultural field. Because top node 650A represents all 3136 fields, regardless of individual fields' feature values, top node 650A also has a GINI coefficient—a value akin to variance in a range of [0, 1] that is indicative of disparity or variance amongst its constituent fields—of 0.939. This suggests a high level of variance between the fields, which would be expected from a large number of fields scattered across a geographic area.

Top node 650A has two children nodes, 650B and 650C. These children nodes represent clusters that are somewhat more granular than the fields represented by top node 650A. Child node 650B represents a cluster of 2591 samples (fields) that satisfy the criterion of the parent node, (top node 650A), and hence, have VP values that are less than or equal to 0.353. Given the large sample size (2591), child node 650B still has a relatively large GINI coefficient of 0.938. The remaining 545 fields (2591+545=3136) are represented by child node 650C, with each field having a vapor pressure (VP) that is greater than 0.353. The number of samples in the cluster represented by child node 650C is significantly smaller than the clusters represented by nodes 650A or 650B. Consequently, the GINI coefficient of child node 650C is smaller, 0.533, indicating less variance than the other two clusters.

Each node in FIG. 6 also includes a feature vector, which is represented in FIG. 6 by the series of squares at bottom of each node. These feature vectors each may include an array of slots that store value ranges and/or thresholds for a variety of different agricultural features. These ranges and/or thresholds may represent constraints for membership in the underlying clusters; i.e., each agricultural field in the cluster may satisfy these ranges/thresholds.

The feature vector of child node 650C is called out in the dashed box 652 for illustrative purposes. This feature vector includes a variety of different features value ranges/thresholds, including: an elevation upper threshold, a Palmer drought severity index (PDSI) lower threshold, a distance to water upper threshold, an accumulated precipitation (prec_acc) upper threshold, a soil moisture lower threshold, a minimum temperature lower threshold, snow water equivalent (SWE) upper threshold, a distance to water lower threshold, a maximum temperature upper threshold, a sand fraction upper threshold, a runoff upper threshold, a VP upper threshold, and a minimum temperature upper threshold. These feature thresholds are provided as examples only, and should not be construed as limiting in any way.

Nodes farther down the hierarchy of decision tree 600 have lower GINI values because they represent more granular clusters that include fewer agricultural fields each. For example, the child nodes 650D and 650E of node 650C represent clusters of 199 and 346 fields, respectively. While child node 650D has a GINI coefficient of 0.528 that is only slightly lower than its parent node (0.533), child node 650E has a GINI coefficient of 0.056—a dramatic decrease from the parent node's GINI coefficient of 0.533.

As two more examples, child node 650D has two of its own child nodes, 650F and 650G. Child node 650F includes 79 samples and has a GINI coefficient of 0.312, somewhat less than the GINI coefficient of its parent node (0.528). The sibling node 650G has 120 samples and a GINI coefficient of 0.0, suggesting a minimal amount of variance between agricultural fields in the cluster represented by node 650G. In some implementations, nodes with GINI coefficients below a particular threshold may be leaf nodes and may not include additional children nodes, although this is not required.

In various implementations, the additional visual annotation described previously may be generated based on a path through decision tree 600. For example, in FIG. 6, the criterion in each node that indicates how that node's children are partitioned may be used as part of the additional visual annotation. Thus, in some examples, a visual annotation for a node such as child node 650F may be a sequence of words or phrases generated based on the criterion of each node from root node 650A to child node 650F. In the example of FIG. 6 this visual annotation for node 650F may resemble something like: "VP>0.353 VP<=0.572 PREC_ACC<=74.9 RADIATION<=72. This type of visual annotation may be highly informative, especially to a relatively sophisticated user. However, it may appear somewhat cryptic or unintuitive to others.

Accordingly, in various implementations, ranges, thresholds, and/or other statistical data generated by traversing a path through decision tree 600 may be mapped to semantically-meaningful words or phrases in order to provide a more intuitive GUI for a user. In some cases these semantically-meaningful words or phrases may be similar to those used with traditional AEZs, such as "cold," "temperate," "hot," "dry," etc. While examples herein relate to providing an additional visual annotation based on a path through decision tree 600, this is not meant to be limiting. In other implementations, especially where semantic mapping is employed to create more intuitive annotations, audio feedback may be provided for a cluster of agricultural fields, e.g., when the user clicks or otherwise selects the cluster or one of its constituent fields. For example, text-to-speech processing may be performed to generate audio (e.g., natural language output) that describes characteristics shared amongst agricultural fields of a cluster, such as "These fields are temperate, have relatively low elevations, and never exceed 28° C."

As noted previously, in various implementations, preprocessing module 124 may be configured to preprocess raw agricultural data from index 122 and store it in preprocessed data index 126. FIG. 7 demonstrates one example technique that may be employed, e.g., by preprocessing module 124, to transform raw agricultural data into a preprocessed form that is usable to partition agricultural fields into a hierarchy of clusters as described herein.

At block 702, preprocessing module 124 may aggregate temporal features. Temporal features may include agricultural features that are measured/sampled multiple times over a time interval (e.g., a crop cycle), and thus may be expressed as time-series data. Temporal features may include, for instance, temperature, precipitation, soil moisture, wind, sunlight, etc. To the extent various temporal features are sampled at different rates (e.g., daily versus weekly versus hourly), at block 704, preprocessing module 124 may impute missing values. For example, a mean of two temporal values may be computed to fill in a gap between those two temporal values. Alternatively, a low frequency temporal value (e.g., weekly rainfall) may be replicated enough times to correspond with higher frequency temporal values, such as daily sunlight.

At block 706, preprocessing module 124 may normalize various agricultural features so that they are at the same scale. At block 708, preprocessing module 124 may selectively apply weights to some agricultural features in order to ensure that relatively sparse features are sufficiently considered. For example, there may be dozens of different climatic features available but a relatively small (or sparse) number of edaphic features, and yet the sparse edaphic features may be just as influential as the climatic features in determining how to manage a field. Accordingly, the relatively sparse edaphic features may be weighted relatively heavily compared to the climatic feature(s).

Then, at block 710, preprocessing module 124 may apply principal component analysis (PCA) to extract some number of principal components that account for the bulk of variance between agricultural fields. In some implementations, preprocessing module 124 may extract fifteen principal components that represent a high level (e.g., ~98%) of the variance among the agricultural fields under consideration, but this is not meant to be limiting. Each principal component may include a single agricultural feature, or may be a combination of multiple different agricultural features. Moreover, other techniques for dimension reduction are also contemplated, in addition to or instead of PCA.

Figure 8:
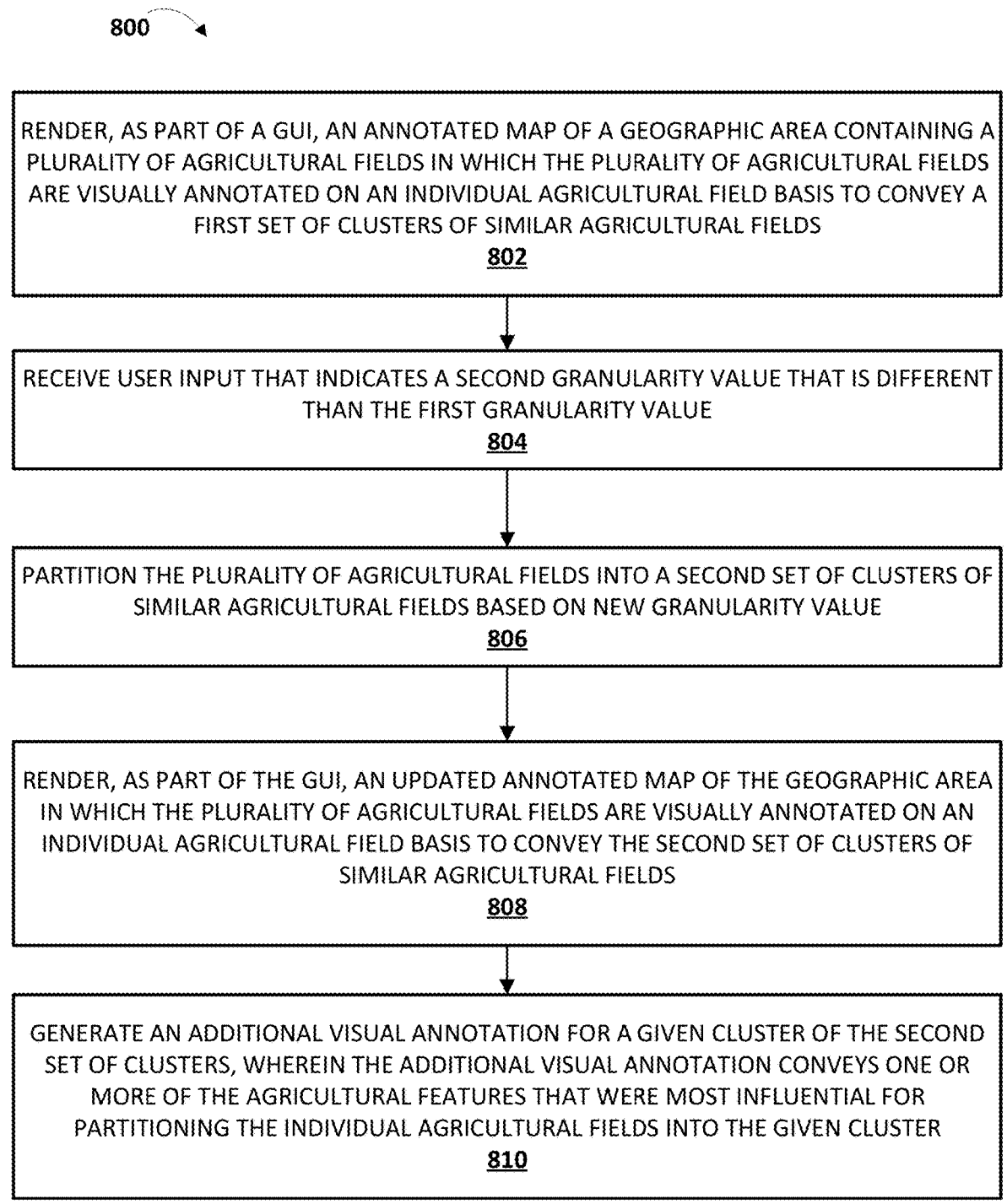
FIG. 8 is a flowchart of an example method in accordance with various implementations described herein.

FIG. 8 illustrates a flowchart of an example method 800 for practicing selected aspects of the present disclosure. The operations of FIG. 8 can be performed by one or more processors, such as one or more processors of the various computing devices/systems described herein, such as by farmland knowledge system 104. For convenience, operations of method 800 will be described as being performed by a system configured with selected aspects of the present disclosure, such as farmland knowledge system 104. Other implementations may include additional operations than those illustrated in FIG. 8, may perform step(s) of FIG. 8 in a different order and/or in parallel, and/or may omit one or more of the operations of FIG. 8.

At block 802, the system, e.g., by way of UI module 130, may render (or cause to be rendered), as part of a GUI such as that depicted in FIGS. 2-4, a map of a geographic area containing a plurality of agricultural fields. In various implementations, the plurality of agricultural fields may be visually annotated on an individual agricultural field-basis to convey a first set of clusters of similar agricultural fields. In some implementations, the plurality of agricultural fields may have been partitioned into the first set of clusters, e.g., by partition module 128, based on a first granularity value and agricultural features of individual agricultural fields of the plurality of agricultural fields.

At block 804, the system may receive user input that indicates a second granularity value that is different from the first granularity value. For example, a user may operate adjustment element 242 to select a different K-value to be employed in K-means or K-median clustering. Based on the second granularity value and the agricultural features, at block 806, the system, e.g., by way of partition module 128, may partition the plurality of agricultural fields into a second set of clusters of similar agricultural fields. In various implementations, a count of the second set of clusters may be different than a count of the first set of clusters as a result of the change to the granularity value.

At block 806, the system, e.g., by way of UI module 130, may render (or cause to be rendered), as part of the GUI, an updated map of the geographic area in which the plurality of agricultural fields are visually annotated on an individual agricultural field-basis to convey the second set of clusters of similar agricultural fields. At block 808, the system, e.g., by way of UI module 130, may generate an additional visual annotation for a given cluster of the second set of clusters. In various implementations, each cluster of the second set of clusters may be interactive (e.g., by clicking on or hovering over a field of the cluster, speaking an identifier associated with the cluster, etc.) to present an additional annotation about agricultural features shared among agricultural fields of the cluster. As noted previously and illustrated in FIGS. 5A-E and FIG. 6, the additional visual annotation may convey one or more of the agricultural features that were most influential for partitioning the individual agricultural fields into the given cluster.

Figure 9:
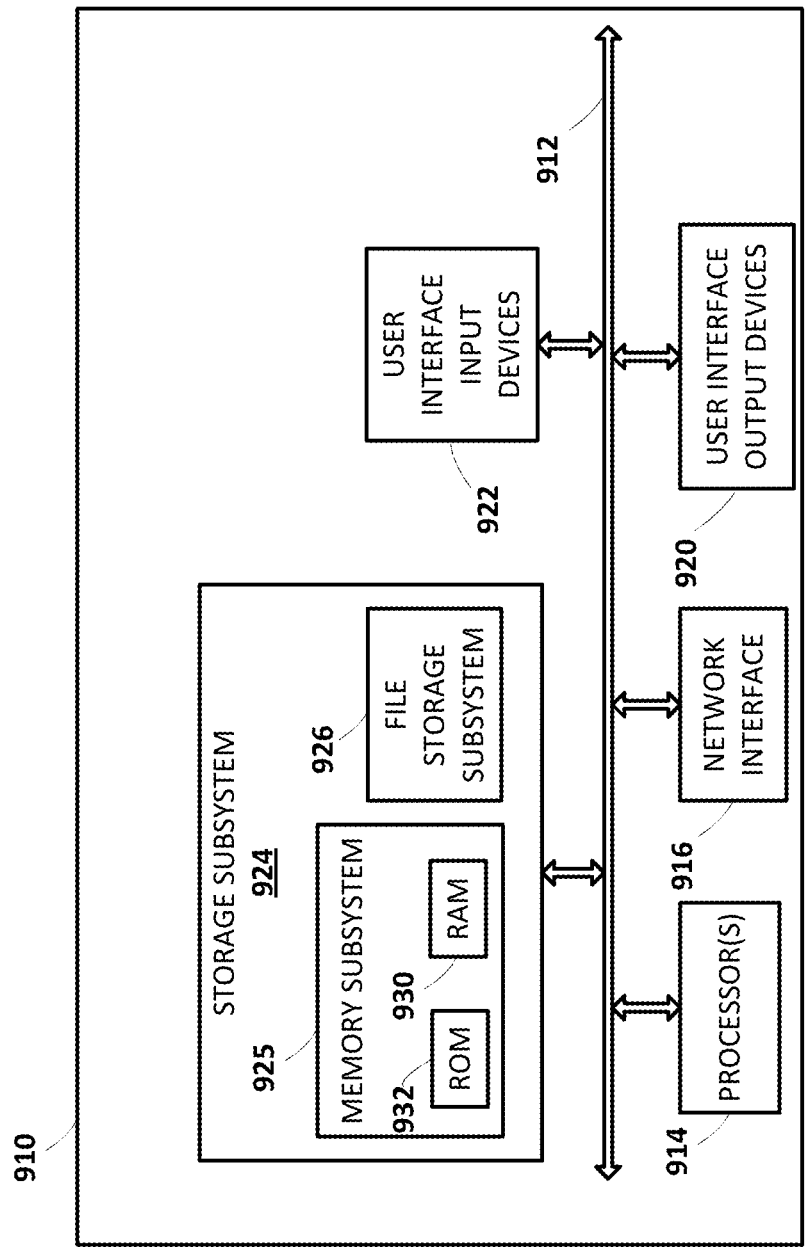
FIG. 9 schematically depicts an example architecture of a computer system.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 910 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of method 800 described herein, as well as to implement various elements depicted in FIGS. 1-7.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   rendering, as part of a graphical user interface (GUI), a map of a geographic area containing a plurality of agricultural fields,
   wherein the plurality of agricultural fields are visually annotated on an individual agricultural field-basis to convey a first set of clusters of similar agricultural fields, and
   wherein the plurality of agricultural fields are partitioned into the first set of clusters based on a first granularity value and agricultural features of individual agricultural fields of the plurality of agricultural fields;
   receiving user input that indicates a second granularity value that is different than the first granularity value;
   based on the second granularity value and the agricultural features, partitioning the plurality of agricultural fields into a second set of clusters of similar agricultural fields,
   wherein a count of the second set of clusters is different than a count of the first set of clusters;
   performing principal component analysis (PCA) on the agricultural features of individual agricultural fields of the plurality of agricultural fields to determine one or more agricultural features that were most influential for partitioning individual agricultural fields into a given cluster of the second set of clusters;
   generating an additional visual annotation for the given cluster of the second set of clusters, wherein the additional visual annotation conveys one or more of the agricultural features that were most influential for partitioning individual agricultural fields into the given cluster; and
   rendering, as part of the GUI, an updated map of the geographic area in which the plurality of agricultural fields are visually annotated on an individual agricultural field-basis to convey the second set of clusters of similar agricultural fields, wherein the given cluster of the second set of clusters is interactive to present the additional visual annotation about agricultural features shared among agricultural fields of the given cluster.

2. The method of claim 1, wherein the additional visual annotation comprises a plurality of simultaneously-rendered histograms of features representing agricultural fields of the given cluster and agricultural fields of another cluster of the second set.

3. The method of claim 1, wherein the second set of clusters comprises a hierarchy of clusters.

4. The method of claim 3, further comprising fitting a decision tree to the hierarchy of clusters.

5. The method of claim 4, wherein the additional visual annotation for the given cluster is generated based on a path through the decision tree.

6. The method of claim 1, wherein the partitioning includes performing K-means clustering, the first granularity value comprises a first K value, and the second granularity value comprises a second K value.

7. The method of claim 1, wherein the agricultural features of individual agricultural fields of the plurality of agricultural fields used to perform the partitioning include one or more landform properties.

8. The method of claim 1, wherein the agricultural features of individual agricultural fields of the plurality of agricultural fields used to perform the partitioning include one or more edaphic features.

9. The method of claim 1, wherein the agricultural features of individual agricultural fields of the plurality of agricultural fields used to perform the partitioning include a measure of evapotranspiration.

10. A system comprising one or more processors and memory storing instructions that, in response to execution of the instructions by the one or more processors, cause the one or more processors to:
    cause to be rendered, as part of a graphical user interface (GUI), a map of a geographic area containing a plurality of agricultural fields,
    wherein the plurality of agricultural fields are visually annotated on an individual agricultural field-basis to convey a first set of clusters of similar agricultural fields, and
    wherein the plurality of agricultural fields are partitioned into the first set of clusters based on a first granularity value and agricultural features of individual agricultural fields of the plurality of agricultural fields;
    receive user input that indicates a second granularity value that is different than the first granularity value;

based on the second granularity value and the agricultural features, partition the plurality of agricultural fields into a second set of clusters of similar agricultural fields,
wherein a count of the second set of clusters is different than a count of the first set of clusters;
perform principal component analysis (PCA) on the agricultural features of individual agricultural fields of the plurality of agricultural fields to determine one or more agricultural features that were most influential for partitioning individual agricultural fields into a given cluster of the second set of clusters;
generate an additional visual annotation for the given cluster of the second set of clusters, wherein the additional visual annotation conveys one or more of the agricultural features that were most influential for partitioning individual agricultural fields into the given cluster; and
cause to be rendered, as part of the GUI, an updated map of the geographic area in which the plurality of agricultural fields are visually annotated on an individual agricultural field-basis to convey the second set of clusters of similar agricultural fields, wherein the given cluster of the second set of clusters is interactive to present the additional visual annotation about agricultural features shared among agricultural fields of the given cluster.

11. The system of claim 10, wherein the additional visual annotation comprises a plurality of simultaneously-rendered histograms of features representing agricultural fields of the given cluster and agricultural fields of another cluster of the second set.

12. The system of claim 10, wherein the second set of clusters comprises a hierarchy of clusters.

13. The system of claim 12, further comprising fitting a decision tree to the hierarchy of clusters.

14. The system of claim 13, wherein the additional visual annotation for the given cluster is generated based on a path through the decision tree.

15. The system of claim 10, wherein the partitioning includes performing K-means clustering, the first granularity value comprises a first K value, and the second granularity value comprises a second K value.

16. The system of claim 10, wherein the agricultural features of individual agricultural fields of the plurality of agricultural fields used to perform the partitioning include one or more landform properties.

17. The system of claim 10, wherein the agricultural features of individual agricultural fields of the plurality of agricultural fields used to perform the partitioning include one or more edaphic features.

18. A non-transitory computer-readable medium comprising instructions that, in response to execution of the instructions by a processor, cause the processor to:
cause to be rendered, as part of a graphical user interface (GUI), a map of a geographic area containing a plurality of agricultural fields,
wherein the plurality of agricultural fields are visually annotated on an individual agricultural field-basis to convey a first set of clusters of similar agricultural fields, and
wherein the plurality of agricultural fields are partitioned into the first set of clusters based on a first granularity value and agricultural features of individual agricultural fields of the plurality of agricultural fields;
receive user input that indicates a second granularity value that is different than the first granularity value;
based on the second granularity value and the agricultural features, partition the plurality of agricultural fields into a second set of clusters of similar agricultural fields,
wherein a count of the second set of clusters is different than a count of the first set of clusters;
perform principal component analysis (PCA) on the agricultural features of individual agricultural fields of the plurality of agricultural fields to determine one or more agricultural features that were most influential for partitioning individual agricultural fields into a given cluster of the second set of clusters;
generate an additional visual annotation for the given cluster of the second set of clusters, wherein the additional visual annotation conveys one or more of the agricultural features that were most influential for partitioning individual agricultural fields into the given cluster; and
cause to be rendered, as part of the GUI, an updated map of the geographic area in which the plurality of agricultural fields are visually annotated on an individual agricultural field-basis to convey the second set of clusters of similar agricultural fields, wherein the given cluster of the second set of clusters is interactive to present the additional visual annotation about agricultural features shared among agricultural fields of the given cluster.

* * * * *